(12) United States Patent
Wu

(10) Patent No.: US 6,285,234 B1
(45) Date of Patent: Sep. 4, 2001

(54) CURRENT-MODE MAGNETIC ISOLATOR FOR SWITCHING DC-DC CONVERTERS

(75) Inventor: Keng Chih Wu, Cranbury, NJ (US)

(73) Assignee: System Design Concepts, Inc., Lawrenceville, NJ (US)

( * ) Notice: Subject to any disclaimer, the term of this patent is extended or adjusted under 35 U.S.C. 154(b) by 0 days.

(21) Appl. No.: 09/467,868

(22) Filed: Dec. 20, 1999

(51) Int. Cl.[7] ...................................................... G06G 7/12
(52) U.S. Cl. ............................ 327/362; 327/109; 327/110
(58) Field of Search ......................... 363/95, 97; 327/109, 327/110, 77, 304, 362, 363

(56) References Cited

U.S. PATENT DOCUMENTS

| | | | |
|---|---|---|---|
| 4,191,929 | 3/1980 | Max et al. | 330/10 |
| 4,510,476 | 4/1985 | Clatterbuck et al. | 336/84 C |
| 4,525,652 | 6/1985 | Sperzel et al. | 315/307 |
| 4,677,536 | 6/1987 | Pepper | 363/89 |
| 4,698,740 | 10/1987 | Rodgers et al. | 363/89 |
| 4,774,419 | * 9/1988 | D'Ariano | 327/109 |
| 4,853,665 | 8/1989 | Olesak | 336/84 C |
| 5,043,598 | * 8/1991 | Maeda et al. | 327/538 |
| 5,276,357 | * 1/1994 | Cripe | 327/109 |
| 5,539,630 | 7/1996 | Pietkiewicz et al. | 363/17 |
| 5,615,091 | 3/1997 | Palatnik | 363/17 |
| 5,917,687 | 6/1999 | Fleckenstein | 361/45 |
| 5,939,927 | * 8/1999 | Myers | 327/108 |

* cited by examiner

Primary Examiner—Toan Tran
(74) Attorney, Agent, or Firm—Synnestvedt & Lechner LLP

(57) ABSTRACT

A signal isolator using magnetic coupling is disclosed. In contrast to the prior art non-isolated voltage summing circuits, the present invention utilizes current summing and magnetic coupling. In addition to providing ground and signal isolation the circuit of the present invention also provides a current-summing node which is always in a high impedance state, thereby allowing ancillary control mechanisms to be easily implemented in the circuit.

8 Claims, 5 Drawing Sheets

Non-isolated Current and Voltage Summing Circuit

CURRENT-MODE MAGNETIC ISOLATOR FOR SWITCHING DC-DC CONVERTERS

FIELD OF THE INVENTION

This invention relates to the field of signal ground isolation and, more particularly, to signal ground isolation using magnetic coupling.

BACKGROUND OF THE INVENTION

In order to provide electrical isolation, e.g., for safety considerations, most switching DC-DC power converters employ conventional optocouplers. FIG. 1 illustrates a prior art optocoupler circuit 100. A steady DC voltage $V_{IN}$ received from the output of a main switching converter (not shown) is scaled by a resistor network 101 and 103 and is compared to a reference voltage $V_{REF}$ via a high gain amplifier 107. Grounding point 102 comprises the power return path. The high gain amplifier 107 compares the scaled $V_{IN}$ and $V_{REF}$ and outputs an error signal voltage $V_{ERR}$, representing the difference between $V_{IN}$ and $V_{REF}$. The error signal voltage $V_{ERR}$ drives an LED 111, causing LED 111 to emit light across isolation barrier 113 to a photo-transistor 119. Grounding point 122 comprises the power return path for this side of the circuit. In a known manner, photo-transistor 119 converts the light emitted from LED 111 back to a current signal representing the difference between the scaled $V_{IN}$ and $V_{REF}$, which is converted by resistor 117 back to a voltage representing the error signal voltage $V_{ERR}$. Resister 105 converts the bias current input to or output from high gain amplifier 107, thereby balancing any input bias-voltage imbalance.

The optocoupler circuit 100 of FIG. 1 provides isolation across isolation barrier 113; however, it operates with a restricted temperature range because the semi-conductor junction materials of photo-transistor 119 can only withstand temperatures between −20° centigrade and 95° centigrade, thereby limiting the dynamic range of the circuit. In addition, since the light emitted by light emitting diodes such as LED 111 is relatively weak in intensity, the isolation barrier 113 between LED 111 and photo-transistor 119 must be kept relatively small. Due to the close proximity of LED 111 with respect to photo-transistor 119, capacitive coupling can occur between the two devices, thereby introducing AC coupling between the two devices and degrading the isolation that they provide.

It is also well known to utilize transformers to provide isolation between two electrical circuits so as to isolate a source of relatively high voltage that powers a device from low voltage devices and/or from a user of the isolated device. For example, isolation transformer are commonly used in medical equipment, such as temperature monitors, electro-cardiograms, oximeters, or invasive blood pressure monitors which include sensors which are in contact with the patient. U.S. Pat. No. 5,615,091, for example, incorporated fully herein by reference, is directed to an isolation transformer for medical equipment.

Non-isolated current sampling voltage summing circuits are also known. FIG. 2 illustrates a prior art current sampling voltage summing circuit 200. As shown in FIG. 2, a resistor-divider comprising resistors 201 and 203 scales a steady DC voltage $V_{IN}$ from a main switching converter and provides an input to a comparator, e.g. high gain amplifier 207. Grounding points 202 comprise the power return path for this side of the circuit. High gain amplifier 207 compares this input with a reference voltage $V_{REF}$ input via resistor 205, just as in FIG. 1. The output $V_{ERR}$ of high gain amplifier 207 is an error voltage signal which is applied to the base of transistor 223 via resistor 221. Transistor 223 acts as a voltage follower, since the error signal voltage $V_{ERR}$ will go across the base-emitter junction of transistor 223 and "sit" on top of the emitter. Thus, the emitter voltage of transistor 223 is the sum of the base-emitter junction voltage of the transistor 223 plus the error voltage $V_{ERR}$, in volts.

A power transformer T1 having a primary winding 227 and a secondary winding 229 is switchable between an energized and a de-energized state by switching transistor 225. Grounding point 222 comprises the power return path for this side of the circuit. In a known manner, a non-isolated current sensing/sampling block 240 yields a current output $kI_P$ that is a scaled version of primary current $I_P$ at current input node 228 with the scaling factor k. The output current, $kI_P$ passes an emitter resistor 209 and produces a pulsating voltage $V_{SENSE}$. This pulsating voltage $V_{SENSE}$ is added to the error voltage sitting at the emitter of transistor 223, and the sum of these two voltages presents itself as a non-isolated feedback signal used in a pulse width modulator. By comparing the non-isolated feedback signal with another known reference voltage, a driving pulse with variable time duration (width) is provided for switching transistor 225. However, due to the non-isolated nature of current sensing/sampling block 240, grounding point 202 and grounding point 222 are in essence the same.

The magnetic coupling circuit 200 of FIG. 2 has certain deficiencies. It does not provide isolation and it must "overcome" the base-emitter junction voltage of transistor 223; thus it is unable to handle low-level signals. For example, if the primary current $I_P$ is relatively small and the sampled current output $kI_P$ multiplied by the ohmic value of the sensing resistor 209 is not large enough to overcome the base-emitter junction of transistor 223, the circuit will not function because the circuit is, in effect, an open circuit. This will cause the control loop to be opened rendering it unable to control the converter output $V_{IN}$. To properly function, the circuit must function at all times.

SUMMARY OF THE INVENTION

An object of the present invention is to provide a signal isolator using magnetic coupling. In contrast to the prior art non-isolated voltage summing circuits, the present invention utilizes current summing and magnetic coupling. In addition to providing ground and signal isolation the circuit of the present invention also provides a current-summing node which is always in a high impedance state, thereby allowing ancillary control mechanisms to be easily implemented in the circuit.

DETAILED DESCRIPTION OF THE PREFERRED EMBODIMENT

Figure 1:
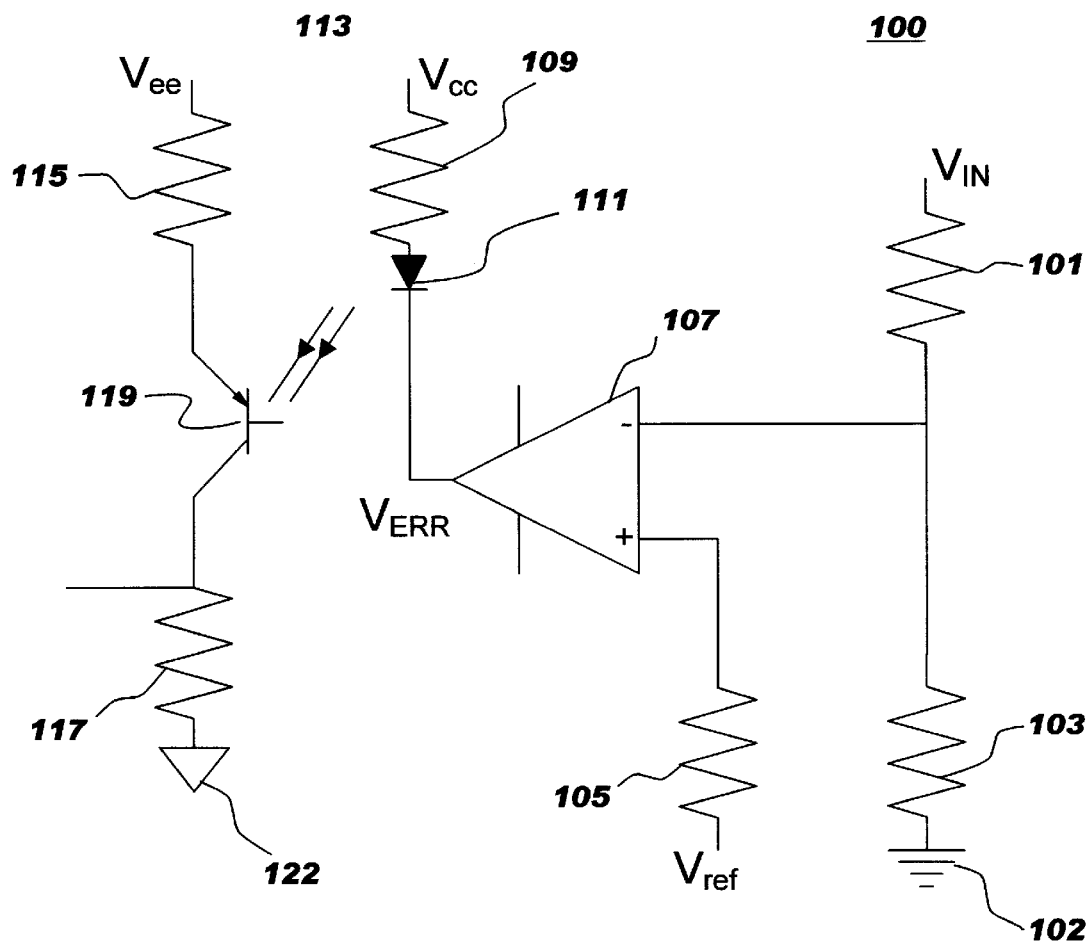
FIG. 1 illustrates a prior art optocoupler used as a signal isolator.
Figure 2:
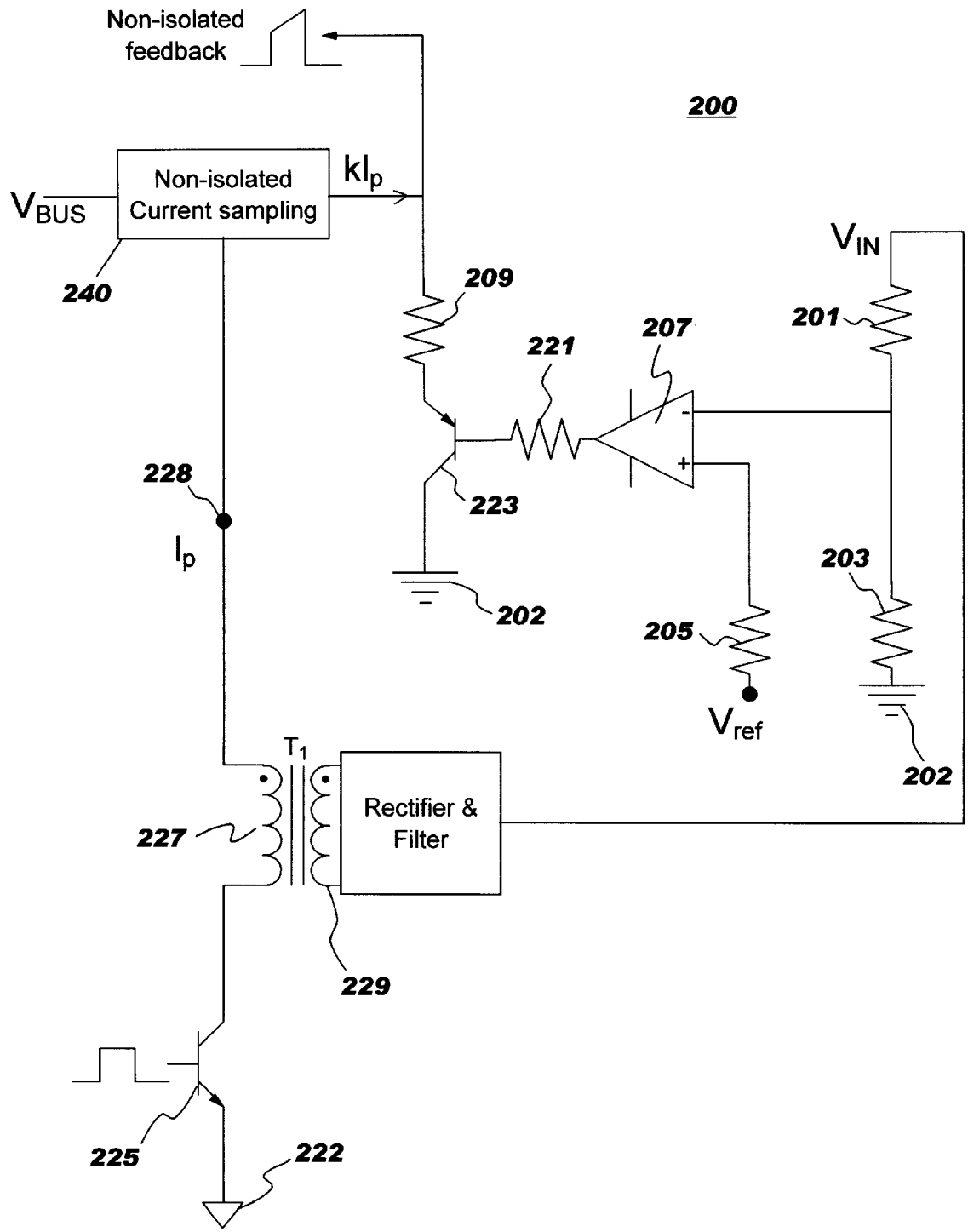
FIG. 2 illustrates a prior art employing non-isolated current sampling and voltage summation.
Figure 3:
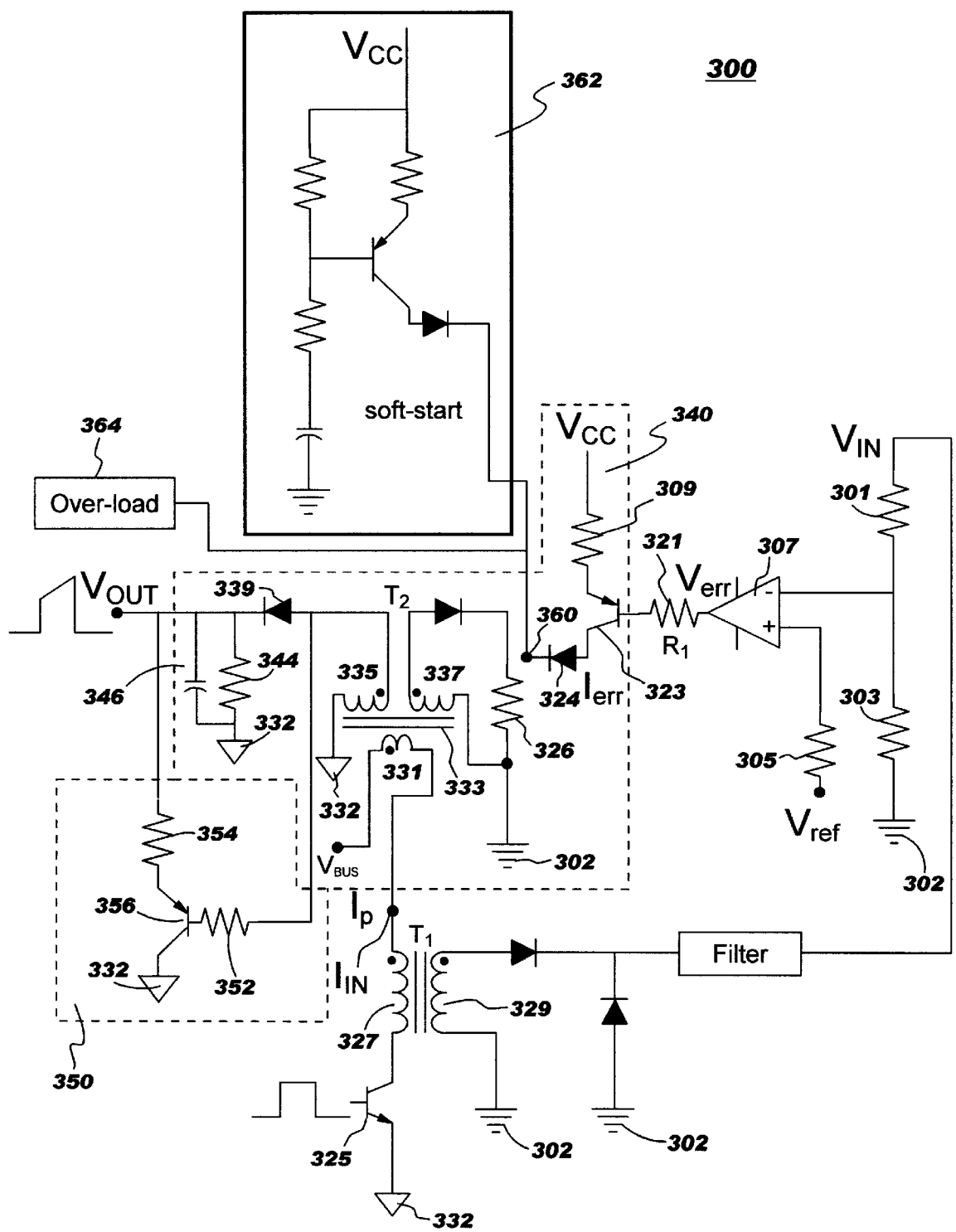
FIG. 3 illustrates an embodiment of the presentation comprising a magnetic isolator using current and current summation.

FIG. 3 illustrates a preferred embodiment of the circuit of the present invention. Referring to FIG. 3, a current summing circuit 300 includes a current summing block 340 and a reset block 350. Grounding points 332 comprises the power return path for both blocks. Current summing block 340 is connected to the output of high gain amplifier 307. In contrast to the prior art circuit of FIG. 2 which sums voltages, the circuit of FIG. 3 sums currents and also isolates the input $V_{IN}$ of the circuit from the output $V_{OUT}$. The current-summing centers around a specific point, high impedance node 360 (discussed in more detail below). As a result many different signal inputs can be presented to the circuit at node 360 without requiring reconfiguration of the circuit. By contrast, voltage summing, as exemplified by the prior art circuit of FIG. 2, involves a complete voltage summing loop (as opposed to a specific point). To enable a loop to accommodate different input signals, the loop must be broken and reconfigured. A one-turn winding 331 is fed through the toroid 333 of a current transformer $T_2$ and acts as the primary winding of current transformer $T_2$. Current transformer $T_2$ has two secondary windings 335 and 337. Thus, current in the primary of power transformer $T_1$ is also reflected to the secondary windings 335 and 337 of current transformer $T_2$ and, thus, current transformer $T_2$ operates as a current sensing transformer. Secondary winding 337 of current transformer $T_2$ senses a fraction of the primary current (called the "reflected current") from power transformer $T_1$, i.e., the primary current $I_P$ of power transformer $T_1$ divided by the number of turns n of secondary winding 337 of current transformer $T_2$.

The error voltage $V_{ERR}$ output from high gain amplifier 307 is converted to a current $I_{ERR}$ via transistor 323. This current $I_{ERR}$ is then summed with the reflected current from secondary winding 337 and "injected" across sensing resistor 326. Thus, the voltage across sensing resistor 326 (the current-sum times the ohmic value of resistor 326) converts the summed currents into voltage, and secondary winding 335 acts as a voltage sampling winding. In essence, the pulsating voltage across secondary winding 335 carries information pertaining to both the voltage loop and the current loop.

Reset circuit 350 is required because when power transformer $T_1$ is energized (i.e. when power transformer $T_1$ has current $I_P$ actively flowing) secondary windings 335 and 337 of current transformer $T_2$ will sense current. However, the primary side current of primary winding 327 alternates on and off due to the switching action of transistor 325. Thus, when the current is off there is no current on the primary winding 327 of power transformer $T_1$ and, under this condition, it is necessary to reset current transformer $T_2$ so that it is ready for the next cycle to begin. Without resetting current transformer $T_2$, the transformer core of current transformer $T_2$ will be saturated and current transformation will cease, opening the control loop.

When the power transistor 325 is turned off, the dotted ends of secondary windings 335 and 337 will change polarity, i.e., they will become negative in terms of voltage. When the dotted end of secondary winding 335 changes polarity and becomes negative, resistor 352 will have a negative voltage applied to it and will forward bias transistor 356. When transistor 356 is forward biased, current flows through the transistor and this current flow resets the core 333 of current transformer $T_2$; at the same time the emitter current also discharges capacitor 346 which is situated in parallel with resistor 344. Resetting the current summing block 340 is important because the capacitor 346 should always start from zero for every operating cycle since a non-zero starting voltage will upset the pulse-width modulation.

The circuit of FIG. 3 makes it possible to implement many additional features which cannot be implemented with the circuit of FIG. 2. The current summing circuit 300 of FIG. 3 includes high impedance node 360. High impedance node 360 is a current source point that is always at a high impedance; thus, a soft-start circuit 362 as shown in FIG. 3 can be connected to high impedance node 360 to, in a known manner, allow for a gradual power up of the circuit 300 and the entire converter. Similarly, an overload circuit 364 can be connected to the high impedance node 360 and, in a known manner, provide an output to shut the system down when an overload condition (e.g., the load current exceeding a specific limit) is reached. Many circuits providing current-form signals can be connected to high impedance node 360; the novelty lies in the provision of the high impedance node 360 and not in the soft-start circuit 362 or the overload circuit 364 themselves.

By way of example only, the following is a list of specific components that may be utilized to construct the circuit of FIG. 3.

| FIG. 3 ITEM | PART NO. |
| --- | --- |
| Transistors 323, 356 | 2N2907 (Motorola) |
| Transformer 333 | F-41005-TC (Magnetics, Inc., Butler, PA) |
| Amplifier 307 | LM158 (National Semiconductor) |
| Diode 339 | 1N6642 |
| Diode 324 | 1N6640 |
| Secondaries 335, 337 | Magnetic Wire AWG#30, 50 turns, Bifilar |
| All resistors other than resistor 326 | RNC55XXXXFS, 1% |
| Resistor 326 | RNC55XXXXBS, 0.1% |

Figure 4:
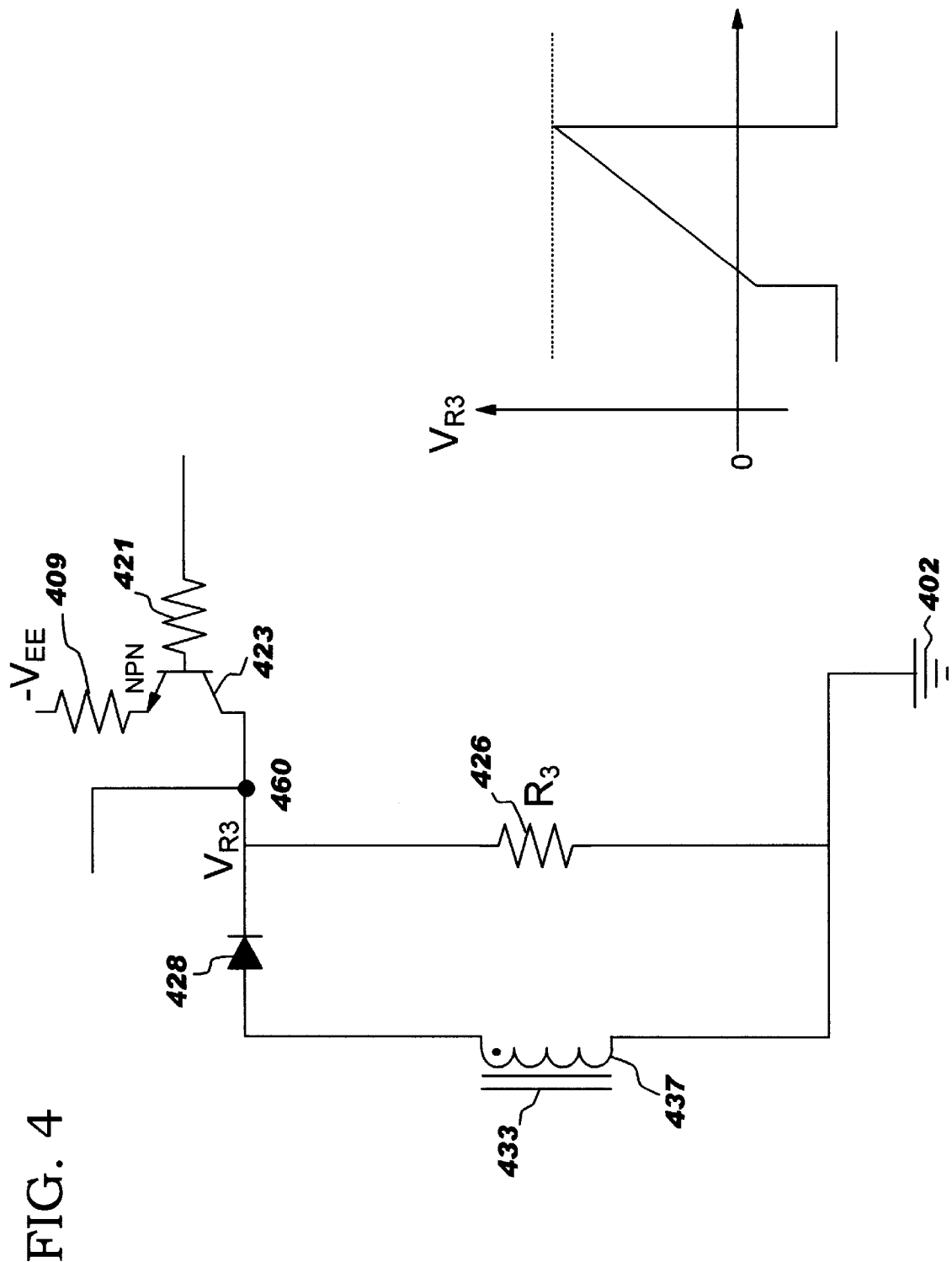
FIG. 4 illustrates an alternative embodiment of a portion of the circuit of FIG. 3.

FIG. 4 illustrates an alternative structure for a portion of the current summing circuit of FIG. 3. In FIG. 4, instead of using the PNP transistor 323 of FIG. 3, an NPN transistor 423 is used. In addition, diode 323 is removed from the circuit. Because of this configuration, resistor 426 can be larger than resistor 326 of FIG. 3. This circuit, instead of being a current summing current, is a current subtraction circuit. Because it is a current subtraction circuit, the dynamic range of the operating voltage is wider and, given the expected peak sensing current, the resistor 426 can be larger, the exact size depending on the overall design of the circuit. The use of a larger resistor results in less gain and therefore better loop stability. While this approach requires the use of a negative power supply, in certain applications (e.g., a power converter with a negative output) this negative control signal technique may be preferred.

Figure 5:
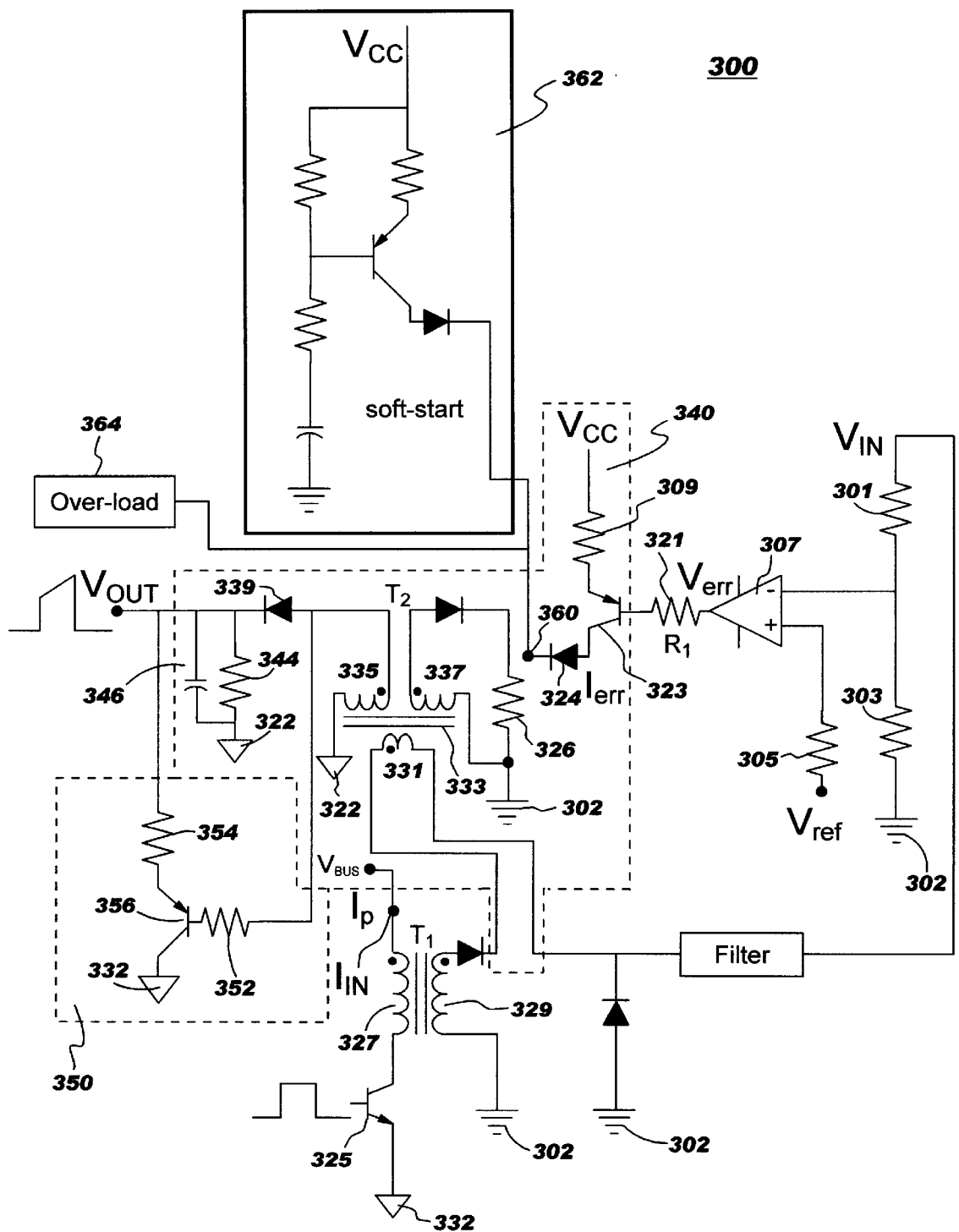
FIG. 5 illustrates an alternative embodiment of the circuit of FIG. 3.
Figure 3:
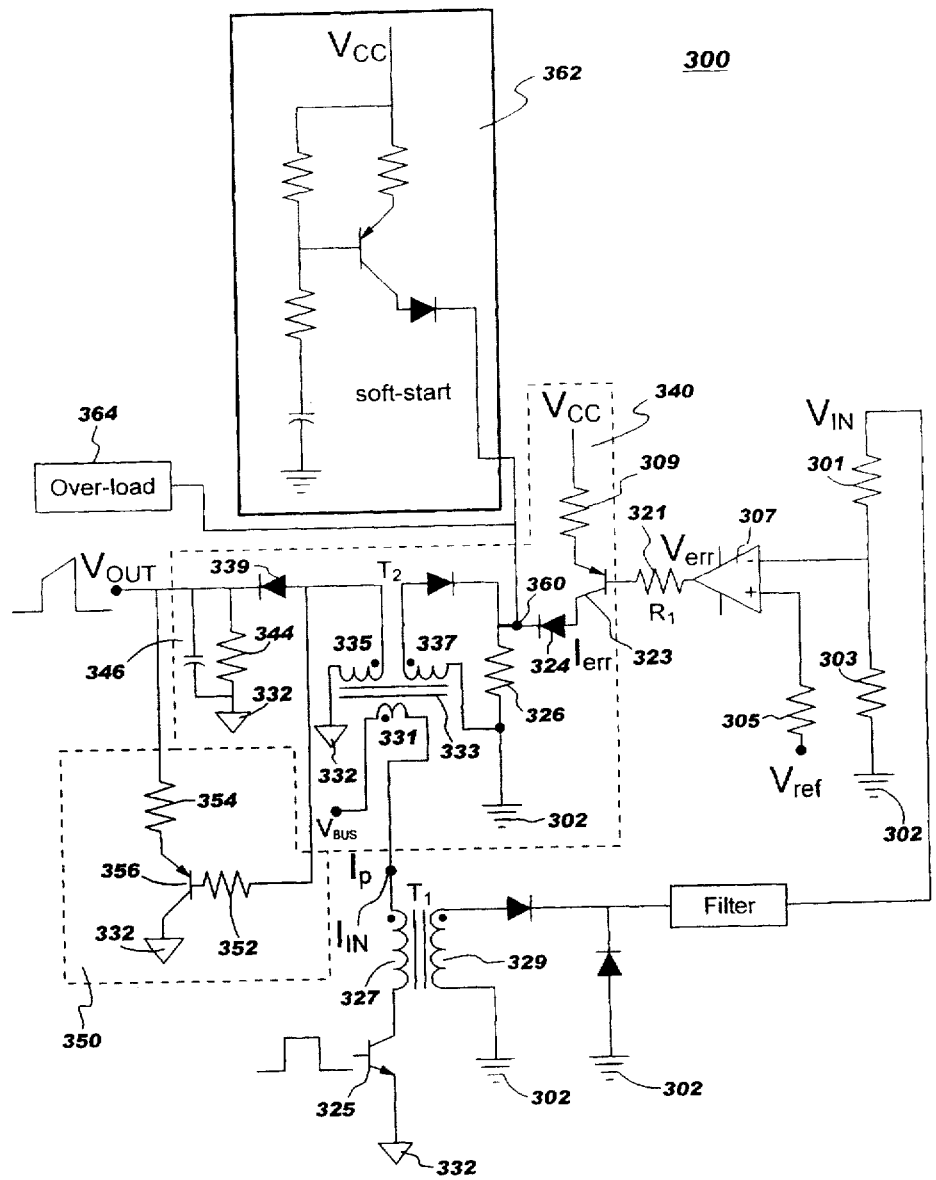
Figure 5:
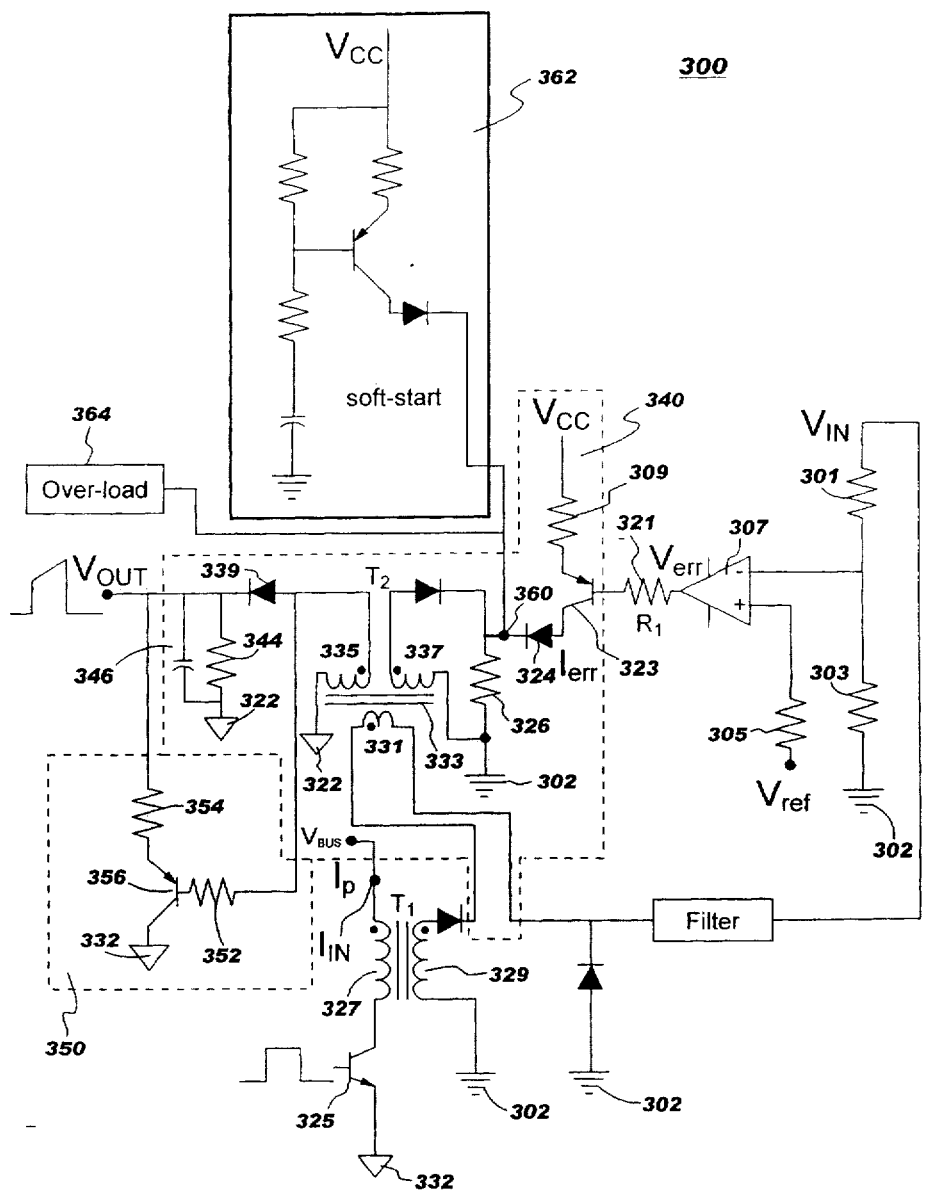

FIG. 5 illustrates an alternative embodiment in which the single turn primary 331 of current transformer $T_2$ of FIG. 3 is moved to the secondary side of power transformer $T_1$. By placing the single turn primary 331 of current transformer $T_2$ on the secondary side of the transformer $T_1$, the same functions of the FIG. 3 circuit are preserved, but with a different scale factor since the secondary current of $T_1$ is proportional to the turn ratio of $T_1$.

In addition to the many benefits described above, the present invention also provides advantages related to loop stability. As mentioned above, the current-transfer-ratio (CTR) of an optical isolator circuit is susceptable to temperature drift. Thermal drift of the CTR eventually results in loop gain fluctuation and consequently, loop instability. Since the current-summing magnetic isolator of the present invention offers a stable coupling coefficient, this also eliminates temperature-induced loop instability.

In addition, conventionally current-mode control schemes compare a pulsating current signal with the optically isolated voltage-loop feedback. Due to the limited filtering capability, the optical isolated voltage-loop feedback carries a low amplitude AC component. Due to the AC component, under some transient conditions (e.g. initial start-up or sudden input or load changes) subharmonic modulation can lock the loop in a sub harmonic modulation mode. This effect will present itself as alternating long and short duty cycles, which results in a frequency at approximately one-half the normal clock cycle. This half-frequency (subharmonic) results in a larger output ripple voltage because the output filter may not be designed to attenuate this voltage component. In accordance with the present invention, instead of comparing the voltage feedback with a pulsating current signal, the present invention compares the composite feedback with a constant dc reference voltage. This eliminates the possibility of the circuit becoming locked into an undesirable operation mode such as a subharmonic modulation mode.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

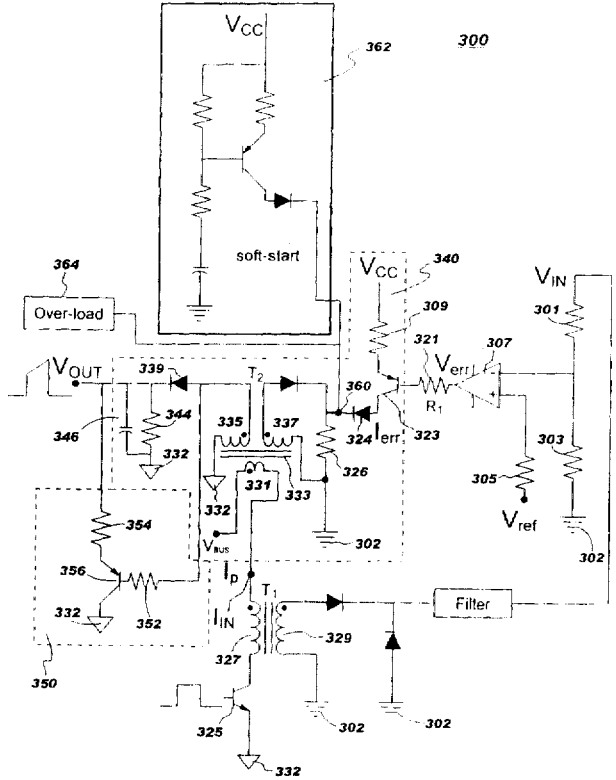

What is claimed is:

1. A magnetic signal isolator comprising:

an input node;

an output node; and a current-summing isolation means, coupled between said input node and said output node, for providing electrical isolation between a signal input to said input node and a signal output from said output node, said current-summing isolation means comprising:

amplifying means for comparing a scaled voltage applied to said input node and a reference voltage and outputting an error voltage representing the difference between said input voltage and said reference voltage;

converting means for converting said error voltage to an error current;

power transforming means, having a primary and a secondary, for providing power to said current summing circuit;

current transforming means, having a primary for sampling current on the primary of said power transformer, and first and second secondaries, said second secondary receiving said current sampled from said power transformer via said primary of said current transformer; and a current-summing node receiving and summing said error current and said current sampled from said power transformer.

2. A magnetic signal isolator as set forth in claim 1, wherein said primary of said power transformer is coupled to a primary side ground and wherein said first secondary of said current transformer is referenced to the primary side ground.

3. A magnetic signal isolator as set forth in claim 1, wherein said power transformer includes a secondary coupled to a secondary side ground and wherein said second secondary of said current transformer is referenced to the secondary side ground.

4. A magnetic signal isolator as set forth in claim 1, wherein said first and second secondaries of said current transformer are physically and electrically separated.

5. A magnetic signal isolator as set forth in claim 1, further comprising means for converting said current sum into a voltage form.

6. A magnetic signal isolator as set forth in claim 5, wherein said first secondary of said current transformer comprises a voltage sampling winding which samples the current sum in voltage form.

7. A magnetic signal isolator as set forth in claim 1, wherein said current-summing node comprises a high-impedance node.

8. A magnetic signal isolator as set forth in claim 5, wherein said current sum in voltage form comprises both voltage feedback and current feedback.

* * * * *

UNITED STATES PATENT AND TRADEMARK OFFICE
CERTIFICATE OF CORRECTION

PATENT NO. : 6,285,234 B1
DATED : September 4, 2000
INVENTOR(S) : Keng Wu

It is certified that error appears in the above-identified patent and that said Letters Patent is hereby corrected as shown below:

Title page,
Should be deleted to be replaced with the attached title page.

Drawings,
Replace Sheet 3 of 5 (Fig. 3) with Fig. 3, attached; and
Replace Sheet 5 of 5 (Fig. 5) with Fig. 5, attached.

Signed and Sealed this

Second Day of April, 2002

*Attest:*

JAMES E. ROGAN
*Attesting Officer*        *Director of the United States Patent and Trademark Office*

(12) United States Patent
Wu

(10) Patent No.: US 6,285,234 B1
(45) Date of Patent: Sep. 4, 2001

(54) CURRENT-MODE MAGNETIC ISOLATOR FOR SWITCHING DC-DC CONVERTERS

(75) Inventor: Keng Chih Wu, Cranbury, NJ (US)

(73) Assignee: System Design Concepts, Inc., Lawrenceville, NJ (US)

(*) Notice: Subject to any disclaimer, the term of this patent is extended or adjusted under 35 U.S.C. 154(b) by 0 days.

(21) Appl. No.: 09/467,868

(22) Filed: Dec. 20, 1999

(51) Int. Cl.[7] ................................................. G06G 7/12
(52) U.S. Cl. ........................ 327/362; 327/109; 327/110
(58) Field of Search ........................ 363/95, 97; 327/109, 327/110, 77, 304, 362, 363

(56) References Cited

U.S. PATENT DOCUMENTS

| | | | |
|---|---|---|---|
| 4,191,929 | 3/1980 | Max et al. | 330/10 |
| 4,510,476 | 4/1985 | Clatterbuck et al. | 336/84 C |
| 4,525,652 | 6/1985 | Sperzel et al. | 315/307 |
| 4,677,536 | 6/1987 | Pepper | 363/89 |
| 4,698,740 | 10/1987 | Rodgers et al. | 363/89 |
| 4,774,419 * | 9/1988 | D'Ariano | 327/109 |
| 4,853,665 | 8/1989 | Olesak | 336/84 C |
| 5,043,598 * | 8/1991 | Maeda et al. | 327/538 |
| 5,276,357 * | 1/1994 | Cripe | 327/109 |
| 5,539,630 | 7/1996 | Pietkiewicz et al. | 363/17 |
| 5,615,091 | 3/1997 | Palatnik | 363/17 |
| 5,917,687 | 6/1999 | Fleckenstein | 361/45 |
| 5,939,927 * | 8/1999 | Myers | 327/108 |

* cited by examiner

Primary Examiner—Toan Tran
(74) Attorney, Agent, or Firm—Synnestvedt & Lechner LLP

(57) ABSTRACT

A signal isolator using magnetic coupling is disclosed. In contrast to the prior art non-isolated voltage summing circuits, the present invention utilizes current summing and magnetic coupling. In addition to providing ground and signal isolation the circuit of the present invention also provides a current-summing node which is always in a high impedance state, thereby allowing ancillary control mechanisms to be easily implemented in the circuit.

8 Claims, 5 Drawing Sheets